Feb. 22, 1938. J. GLOVER Re. 20,657

FLOOR POLISHING DEVICE

Original Filed April 24, 1933

Inventor:
John Glover
By:- Cox & Moore
attys.

Reissued Feb. 22, 1938

Re. 20,657

UNITED STATES PATENT OFFICE 20,657

FLOOR POLISHING DEVICE

John Glover, Chicago, Ill., assignor, by mesne assignments, to Midway Chemical Co., Jersey City, N. J., a corporation of New Jersey Original No. 1,983,363, dated December 4, 1934, Serial No. 667,661, April 24, 1933. Application for reissue December 4, 1936, Serial No. 114,206

13 Claims. (Cl. 15—231)

The present invention has to do with a wax spreading and floor polishing device.

The objects of the invention include a simplified structure for a polishing device suitable for manipulation from a standing position; a new and improved structure for a device adapted to hold a pad to spread wax evenly over a floor or other surface; and new and improved means for attaching a handle and a polishing pad to a waxing apparatus.

These objects, and such other objects as may hereinafter appear are obtained by the unique construction, improved combination, and novel arrangement of the several elements constituting the invention, one form of which is illustrated in the accompanying drawing, in which.

Like reference characters are used to designate similar parts in the drawing and in the description of the invention which follows.

Figure 2:
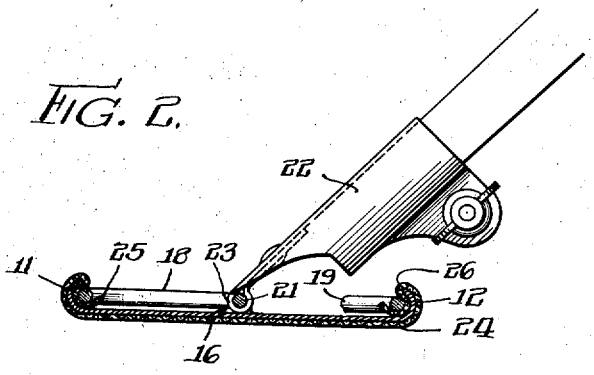
Figure 2 is a central section taken transversely of the device shown in Figure 1.

Weight is considered essential in a successful wax spreading and polishing device. The present invention comprises a relatively heavy base or frame 10 which may be of heavy iron or sheet steel. The weight desired will govern the thickness of the material. At opposite sides thereof are upstanding flanges 11 and 12, the character of which is definitely set forth in Figure 2. The inner wall of said flanges is grooved as shown in Figure 2.

In order to permit the operator to have easy access to the pad holding and releasing members, the opposed ends, preferably, of the flanges 11 and 12, terminate at a point or points removed from the end edge of the plate 10.

Figure 1:
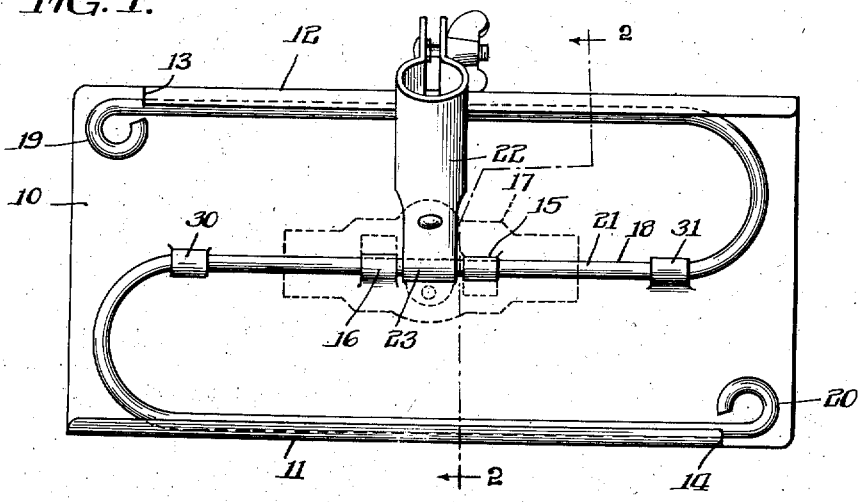
Figure 1 is a plan view of a device embodying the subject matter of the invention.
Figure 3:
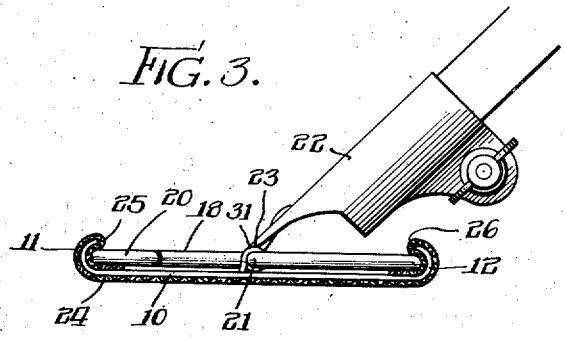
Figure 3 is an end elevation of the device shown in Figure 1 with a pad attached thereto.

At the center of the device, two or more tongues 15 and 16 are "bumped up." The bumping tool or device may impress the material of the base in a manner to produce a figure like that shown in the dotted outline 17 of Figure 1.

Spring means are provided for holding the pad in operating position with respect to the plate 10. The spring means comprises parallel leg portions adapted to be resiliently pressed into the opposed end flanges 11 and 12 of the plate and to be held therein by the resiliency of the spring means. This spring means preferably comprises a single piece of wire having free ends provided with finger holds or grips for distorting or pressing the free ends inwardly so as to release the spring legs from the flange portions of the plate, thereby releasing the pad from the plate proper.

In the present embodiment of my invention, I have illustrated the spring means as comprising a spring 18 having ring ends 19 and 20 and preferably of an S shape. This spring means is disposed intermediate the flanges 11 and 12 so that the two opposed legs of the spring means are lodged in the grooves of the flanges 11 and 12. The central section 21 of this spring is disposed beneath the tongues 15 and 16, which tongues point in opposite directions. The tongues are turned down upon and over section 21 of the spring 18 firmly to secure the spring 18 in assembly with the base 10.

For attaching a handle shown fragmentarily, there is supplied a socket 22. Said socket has an end section 23 extending about section 21 of the spring 18, the spring 18 forming a pivot for angular movement of the mop handle to adjust itself to the requirements of the user of the device.

In use, a pad 24 having end extensions 25 and 26 is disposed under the plate with the body of the pad resting flatly upon the under side of the plate and with the ends 25 and 26 extending over the flanges 11 and 12. To secure the extensions 25 and 26 in position, the spring 18 is manipulated, generally, first at one side, and then at the other side by the use of the finger sections 19 and 20.

By these grip pieces, the end sections of the spring may be drawn towards the center of the plate and away from the flanges 11 or 12 as the case may be, to allow the insertion of a flap 25 or 26 upon the grooved interior periphery of the flange, after which the spring 18 is released to grip the extension 25 or 26 of the pad 24 and to maintain the pad in close physical contact with the flange of the plate.

The cut-away sections 13 and 14 of the flanges 11 and 12 are to provide room for the ready use of the finger pieces 19 and 20. In forming the tongues 15 and 16, the material may be depressed therebetween to facilitate the attachment of the socket 22.

The pad may be of lambs' wool, cloth, or any other suitable material. It is saturated with wax and moved across a floor or other surface to be polished. When the pad 24 is worn out, it is readily removed by gripping the spring first at the finger piece 19 and then at the finger piece 20 to release the extensions 25 and 26 of the pad.

When desired, additional tongues or lugs may be provided for holding the section 21 of the spring member, these being indicated by the numerals 30 and 31. Generally they are opposed in direction and are formed by suitable tool work upon the member 10.

What is claimed as new and is desired to be secured by Letters Patent of the United States is:

1. A polishing device comprising a rectangular body, an S-shaped spring of a length and width substantially equivalent to the length and width of said body, and means engaging said spring at its middle section for holding it upon said body, the top and bottom of said spring coinciding with the front and back edges of said body and forming resilient grip pieces for a pad to be attached to said body.

2. A polishing device comprising a flat plate having flanges at opposed edges, a pad having ends extending over said flanges, an S-shaped spring of a width and height corresponding with the width and length of said plate and having top and bottom transverse sections coinciding with said flanges and a central transverse section, and means for securing the central section of said spring to said plate, the top and bottom sections resiliently engaging the material of the pad overlapping said flanges.

3. In a polishing device, a plate, an S-shaped spring secured at the middle section thereof to said plate and having top and bottom sections normally in resilient engagement with said plate and adapted to hold a pad upon said plate, and a socket upon the middle section of said S-shaped spring for a handle for said device.

4. A polishing device comprising a plate, an S-shaped spring of a width and height corresponding to the width and length of said plate and having a top, a bottom and an intermediate section, the latter section being in contact with the face of said plate, means for securing the intermediate section of said spring to said plate with the top and bottom sections coinciding with and in resilient engagement with said plate at its front and back edges, a pad having ends insertable between said plate and said top and bottom sections of said spring for removable attachment to said plate, and a handle socket on said intermediate section.

5. A polishing device comprising a plate having tongues projecting from the face thereof and curved flanges extending upwardly from opposite edges thereof, an S-shaped spring having top, bottom and intermediate sections, said spring at its intermediate section being held on said plate by said tongues, the top and bottom sections of said spring resiliently engaging said flanges for holding sections of a pad on said plate, and a handle socket upon the intermediate section of said spring.

6. A polishing device comprising a plate having tongues and opposed edge sections, an S-shaped spring upon the face of said plate and having an intermediate section, a top section, a bottom section, and finger pieces at the ends of said top and bottom sections, the intermediate section of said spring being held in position on said plate by said tongues, the top and bottom sections of said spring resiliently engaging the edge sections of said plate and being removable therefrom by manual manipulation of the finger pieces, and a handle socket upon said intermediate section between said tongues.

7. In a polishing device, a plate having flanges upon two opposite edges, and an S-shaped spring having a top section, a bottom section, and an intermediate section, said intermediate section being anchored upon said plate between said flanges, the top and bottom sections extending in parallelism with said flanges and in resilient engagement therewith for securing a pad upon said device.

8. A polishing device comprising a plate having upturned flanges at opposed edges and tongues upon the transverse median line thereof parallel to said flanges, an S-shaped spring forming a pad attaching device, said S-shaped spring having a straight intermediate section of a length in excess of one-half the length of the opposed sides of said plate, a top section, and a bottom section, the intermediate section being secured to said plate by said tongues, the top and bottom sections resiliently engaging the flanges of said plate to hold the ends of a pad against said flanges, and a socket pivoted to an intermediate section of said S-shaped spring.

9. A polishing device comprising a plate having up-turned flanges at opposed edges and spaced apart tongues disposed upon the transverse median line thereof parallel to said flanges, an S-shaped spring having an intermediate section of a length in excess of one half the length of the opposed sides of said plate, a top section, a bottom section, and finger ring sections at the ends of said top and bottom sections, the intermediate section of said spring being secured to said plate by said tongues, the top and bottom sections resiliently engaging said up-turned flanges to hold the ends of a pad on said plate and against said flanges, and a socket pivoted to the intermediate section of said spring between said tongues.

10. A polishing device comprising a plate having up-turned flanges at opposite edges thereof, and tongues on the face of said plate between the flanges, there being sections of such edges free of said flanges, and a bent spring member having a top section, a bottom section and an intermediate section, the intermediate section of said member being held upon said plate by said tongues, said top and bottom sections having finger pieces at their ends, said top section and said bottom section resiliently pressing the material of a polishing pad disposed upon said plate against said flanges, said finger pieces registering with the sections of the edges of said plate free from up-turned flange sections.

11. In a polishing device, a plate having substantially parallel spaced-apart edge portions forming seats for the resilient engagement of the leg portions of a spring wire, a stick socket having a hinged connection with said plate substantially at its middle point, and spring means for detachably holding a polishing pad to said plate comprising a single piece of spring wire, said wire being fixedly secured adjacent the central portion thereof to the plate and having substantially parallel leg portions, each leg portion having a free end spaced apart from the free end of the other leg portion, said leg portions being integrally united by laterally-bent, resilient portions whereby resiliently to urge the leg portions outwardly into gripping detachable engagement with said seat portions of the plate.

12. In a polishing device, a plate having substantially parallel spaced-apart edge portions with metal along the edge portions being curled inwardly to provide opposed substantially parallel overhanging flanges, a stick socket having a hinged connection to said plate substantially at its middle point, spring means for detachably holding a polishing pad to said plate comprising a single piece of spring wire having substantially parallel leg portions united by a resilient, intermediate bent portion resiliently urging the leg portions outwardly, said spring means lying flat upon the upper surface of said plate with its spring leg portions underlyingly housed within the overhanging flanges of the plate portion and pressing resiliently thereagainst, said legs having free end portions located adjacent the end portions of the plate and having manually actuable grips, certain portions of the overhanging flanges at the plate terminating short of the end portions of the plate to permit access to the free ends of the leg portions for pressing the same inwardly to release the spring means from its resilient clamping engagement with the overhanging flanges of the plate.

13. In a floor polishing device, the combination of a plate of substantially rectangular shape, a pair of opposed edges of the plate having portions bent upwardly and curled inwardly to provide overhanging marginal flanges lying in spaced-apart substantially parallel relation, a polishing pad covering the under side of the plate and having its edges overlying and depending from the overhanging flanges, a single piece of spring wire arranged in a substantially flat plane and bent upon itself to provide opposed substantially elongated spring wire legs having free ends spaced apart substantially the width of the plate with an intermediate bent portion, said bent portion lying upon the flat upper side of the plate and the leg portions pressing the pad edges against the overhanging flanges whereby resiliently to hold the pad in stretched position to the plate.

JOHN GLOVER.